United States Patent
Chun et al.

(10) Patent No.: US 8,590,767 B2
(45) Date of Patent: Nov. 26, 2013

(54) METHOD FOR WELDING HOLLOW STRUCTURE

(75) Inventors: Chang-Kun Chun, Pohang (KR); Woong-Seong Chang, Pohang (KR); Tae-Sung Roh, Changwon-shi (KR); In-Gyu Park, Suwon-si (KR)

(73) Assignees: Research Institute of Industrial Science & Technology, Pohang (KR); Hyundai Rotem Company, Changwon-Si (KR); Winxen Co., Ltd., Changwon-Si (KR)

( * ) Notice: Subject to any disclaimer, the term of this patent is extended or adjusted under 35 U.S.C. 154(b) by 273 days.

(21) Appl. No.: 13/164,867

(22) Filed: Jun. 21, 2011

(65) Prior Publication Data

US 2012/0325894 A1    Dec. 27, 2012

(51) Int. Cl.
*B23K 20/12* (2006.01)
*B23K 33/00* (2006.01)

(52) U.S. Cl.
USPC .................. 228/112.1; 228/2.1; 156/73.5

(58) Field of Classification Search
USPC ............................. 228/2.1, 112.1; 156/73.5
See application file for complete search history.

(56) References Cited

U.S. PATENT DOCUMENTS

| | | | | |
|---|---|---|---|---|
| 5,813,592 A | * | 9/1998 | Midling et al. | 228/112.1 |
| 6,050,474 A | * | 4/2000 | Aota et al. | 228/112.1 |
| 6,193,137 B1 | * | 2/2001 | Ezumi et al. | 228/112.1 |
| 6,413,610 B1 | * | 7/2002 | Nakamura et al. | 428/98 |
| 6,568,872 B2 | | 5/2003 | Kawasaki et al. | |
| 6,581,819 B1 | * | 6/2003 | Aota et al. | 228/112.1 |
| 6,599,641 B1 | * | 7/2003 | Nakamura et al. | 428/593 |
| 2001/0009723 A1 | | 7/2001 | Kawasaki et al. | |
| 2008/0096038 A1 | | 4/2008 | Nagano | |
| 2008/0308610 A1 | * | 12/2008 | Watson et al. | 228/112.1 |

FOREIGN PATENT DOCUMENTS

JP    2000317653 A  * 11/2000
KR    10-2010-0074074    7/2010

OTHER PUBLICATIONS

Shinoda et al., "Friction stir welding of aluminium plate", Welding International, vol. 11, issue 3, 1997, p. 179-184.*

* cited by examiner

*Primary Examiner* — Devang R Patel
(74) *Attorney, Agent, or Firm* — Lexyoume IP Meister, PLLC.

(57) ABSTRACT

In the method for welding a hollow structure of the present invention, a rib is placed between a first joining member and a second joining member, and friction stir welding and fixing a place where the rib is placed between the first and the second joining member are conducted. Thus, friction stir welding is accomplished without changing the shape of an extrusion part or partly changing the shape of the extrusion part with insertion of a simply shaped rib.

16 Claims, 7 Drawing Sheets

METHOD FOR WELDING HOLLOW STRUCTURE

BACKGROUND OF THE INVENTION (a) Field of the Invention

The present invention relates to a method for welding a structure, and more particularly, the present invention relates to a method for welding a hollow structure.

(b) Description of the Related Art

Friction stir welding was developed by TWI in the United Kingdom in 1991. Friction stir welding is a solid-state welding process that uses frictional heat and a plastic flow phenomenon that occurs when inserting a rotating tool into a material to be welded. The sold-state welding process is applied to weld a variety of light metals because, compared to fusion welding process, a solid-state welding process induces low distortion to materials. Due to the above merit, Hitachi in Japan uses a friction welding process to fabricate the frames of railway vehicles, instead of using metal inert gas (MIG) welding.

However, when friction stir welding is used to weld a material, a high load is applied to the material because friction welding is a kind of mechanical welding process. For this reason, there is problem that when designing a shape to be welded, a rib needs to be inserted to support a load and thus designing a shape to be welded is complicated, and the shapes of extrusion tools for extrusion are complex.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a method for welding a hollow structure by friction stir welding an extrusion part without changing or partly changing the shape of the extrusion part while inserting a simply shaped rib.

Accordingly to an exemplary embodiment of the present invention, the method for welding a hollow structure includes a step for placing a rib between a first joining member and a second joining member, and a step for friction stir welding and fixing a position where the rib is placed between the first joining member and the second joining member. The rib has a recessed upper joining part and a lower joining part, and the first joining member and the second joining member have a symmetric shape with respect to the rib. The first joining member has an upper side part and a lower side part, and the upper side part of the first joining member and the upper side part of the second joining member contact the upper joining part of the rib, while the lower side part of the first joining member and the lower side part of the second joining member may contact the lower joining part of the rib.

The friction stir welding may be conducted using a tool that includes cylindrical shaped body, and a probe which is connected to the lower part of the body and extends vertically.

A speed of the tool in the friction stir welding is 1500 rpm to 1700 rpm.

A welding speed of the friction stir welding is 10 mm/s to 17 mm/s.

The diameter of the body is substantially greater than the diameter of the probe, the underside of the body has a concave shape with a predetermined radius of curvature, and the body and the probe may share a same center line with an axis of a spindle to which the tool is fixed and provides torque. The upper joining part and the lower joining part have a first width, and the first width may be greater than the width of the probe.

The rib includes an upper side part and lower side part, and on top of the upper joining part of the rib, an upper side part of the rib is formed to extend on the first and the second joining member that contact with the upper joining part of the rib, and under the lower joining part of the rib, the lower side part is formed to extend on the first and the second joining member that contact with the lower joining part of the rib. The upper and lower joining part have a first width, and the upper and lower side of the rib have a second width that is greater than the first width, and the second width may be substantially same with the lower width of the body.

The thickness of the upper and lower side part of the rib may be 0.1 mm-5 mm.

In another exemplary embodiment of the present invention, the method for welding a hollow structure includes: a step for preparing joining members that have an upper side part and a lower side part; a step for preparing a rib, wherein a recessed upper joining part and lower joining part is respectively formed at the upper side and lower side of the rib to join the upper side part and the lower side part of the joining member, an upper protruded part that extends on the upper side of the joining member is formed on the upper joining part, and a lower protruded part that extends on the lower side of the joining member is formed on the lower joining part; and a step for joining the combined joining member and the rib by friction stir welding.

The friction stir welding may be conducted using a tool that includes cylindrical shaped body, and a probe which is connected to the lower part of the body and extends vertically.

A speed of the tool in the friction stir welding is 1500 rpm to 1700 rpm.

A welding speed of the friction stir welding is 10 mm/s to 17 mm/s.

The diameter of the underside of the body is substantially greater than the diameter of the probe, the underside of the body has a concave shape with a predetermined radius of curvature, and the body and the probe may share a same center line with an axis of a spindle to which the tool is fixed and provides torque. The width of the upper and lower protruded parts of the rib may be substantially same as the lower width of the body. The thickness of the upper and lower protruded parts of the rib may be 0.1 mm~5 mm.

According to the present invention, extrusion may be conducted by friction stir welding a member without changing or partly changing insertion of a simply shaped rib. Thus, the problem that design complexity resulting from the insertion of a rib to support a load when designing a joint shape and a complicated shape of an extrusion tool for extrusion may be solved.

DETAILED DESCRIPTION OF THE EMBODIMENTS

Figure 1:
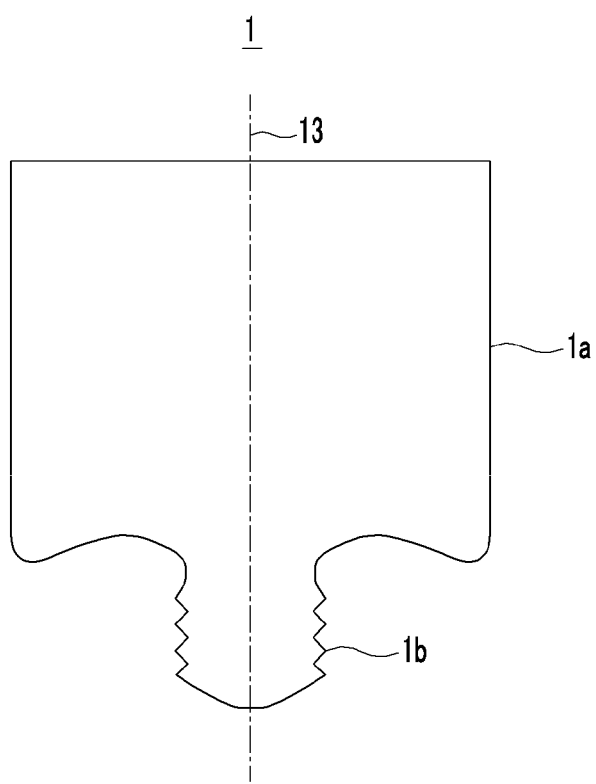
FIG. 1 is a cross-sectional view of a tool that is included in a friction stir welding device accordingly to an exemplary embodiment of the present invention.

The exemplary embodiments of the present invention are explained hereinafter by referring to the attached drawings.

In the drawings: i) a drawn shape, sized, ratio, angle, number, motion is an approximation and may be changed somewhat; ii) because a drawing is drawn with respect to a viewpoint of an observer, the direction and position for explaining the drawing may be changed depending on the viewpoint of the observer; iii) even if a reference numeral is different, a same reference numeral may be used with respect to a same portion; iv) when words such as "comprise", "have", "done", etc. are used, other parts may be added unless the word "only" is used; v) when explained as a singular, an interpretation as a plural is possible; vi) even if a numeral value, shape, the comparison of size, positional relationship, etc. is not explained as "about" or "substantially", an interpretation is possible to include a normal error range; vii) even if the words such as "after", "before", "subsequently", "and", "where", etc. are used, the words are not used to define only a location in time; viii) words such as "first" and "second" are used selectively, alternatively, or repeatedly for the purpose of simple differentiation, and are not interpreted as having a definitive meaning; ix) unless the word "only" is not used when explaining a location relationship between two parts using words such as "on", "on top", "at the bottom", "by", etc., at least one of other parts may be interposed between the two parts; and xi) when some parts are connected with "or", a combination of the parts as well as the parts itself are interpreted as included, but when the parts are connected with "or one of", the parts are interpreted as the parts alone.

A Tool for Friction Stir Welding

FIG. 1 is cross-sectional view of a friction stir welding device according to an exemplary embodiment of the present invention.

Referring to FIG. 1, a tool (1) includes a substantially cylindrical shaped body (1a) and a probe (1b) that is connected to the underside of the body (1a) and extends vertically.

The diameter of the body (1a) is substantially greater than the diameter of the probe (1b), and the underside of the body (1a) has a concave shape with a predetermined radius of curvature.

The concave shape may improve the fluidity of the welding member when friction stir welding is conducted.

The body (1a) and the probe (1b) share the same center line (13) with an axis of a spindle to which the tool (1) is fixed and provides torque.

Thus, the body (1a) and the probe (1b) integrally rotate with the tool (1) for friction stir welding in a clockwise or counter-clockwise direction, wherein, because the probe (1b) rotates at a relatively great speed, it is desirable for the probe (1b) to be made of a high-speed tool steel.

For example, the probe (1b) may be made of a SKD or SKH series tool steel.

The probe (1b) is inserted into a position for welding by rotating the tool (1) with a predetermined rotating speed.

The position for welding is friction stir welded through frictional heat and the plastic flow phenomenon that occur at the position with the rotation of the probe (1b).

Method 1 for Welding Hollow Structure

Figure 2:
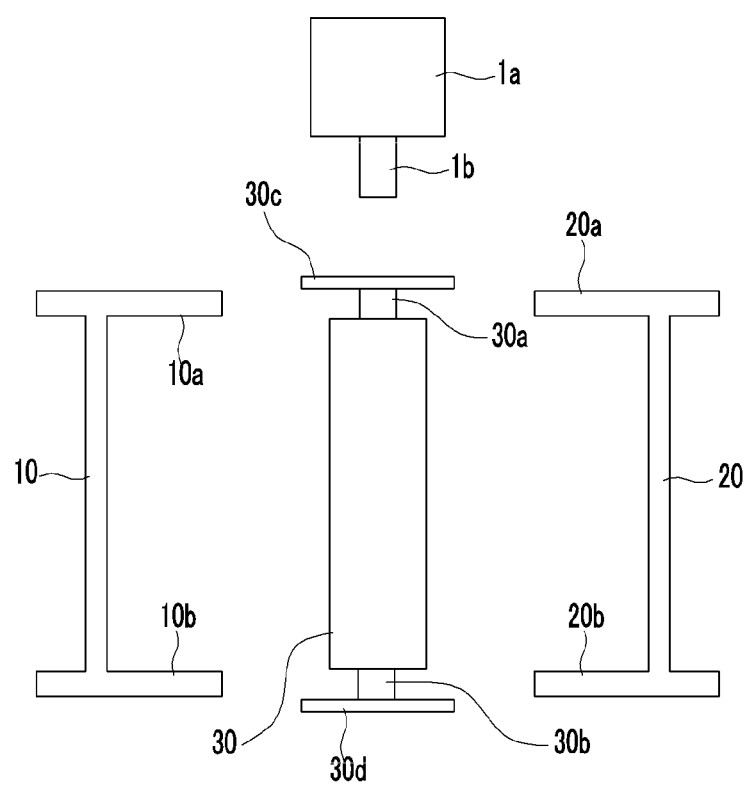
FIGS. 2 to 4 are drawings that explain the method for welding a hollow structure according to an exemplary embodiment of the present invention.
Figure 3:
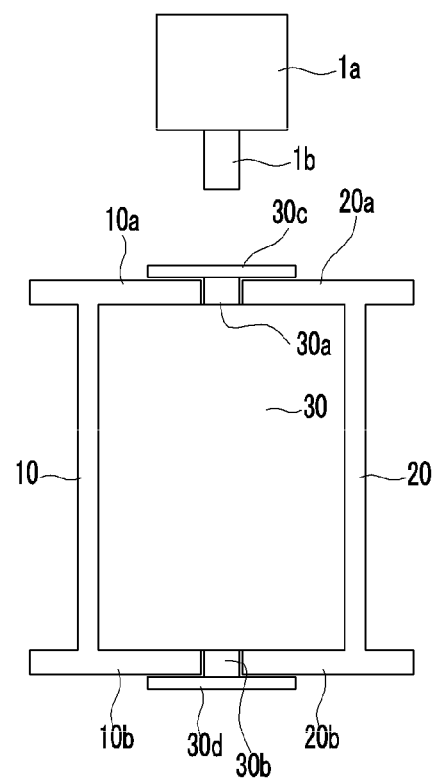
Figure 4:
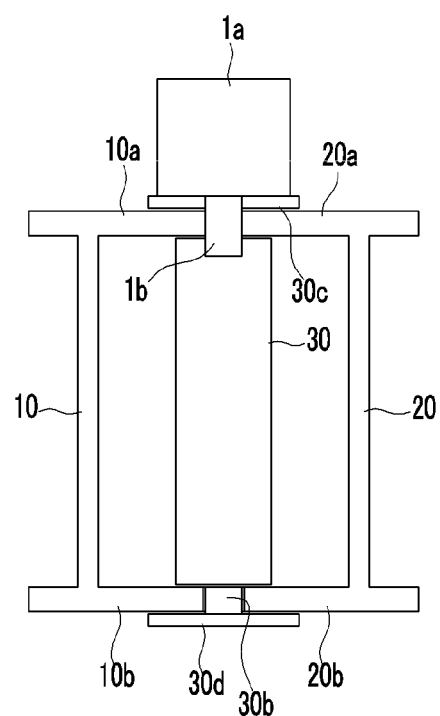

FIGS. 2 to 4 are drawings for explanation of the method for welding a hollow structure according to an exemplary embodiment of the present invention.

Referring to FIGS. 2 to 4, a first joining member (10), a second joining member (20), and a rib (30) are prepared.

The rib (30) has bilateral symmetry, and has a recessed upper joining part (30a) and a recessed lower joining part (30b).

The first joining member (10) and the second joining member (20) may have a symmetric shape with respect to the rib (30).

An upper side part (10a) of the first joining member (10) and an upper side part (20a) of the second joining member (20) are connected to the upper joining part (30a) of the rib (30), and a lower side part (10b) of the first joining member (10) and a lower side part (20b) of the second joining member (20) are connected to the lower joining part (30b) of the rib (30). An upper side part (30c) of the rib (30) is formed on top of the upper joining part (30a) of the rib (30) to extend on the first and second joining members (10, 20) that contact the upper joining part (30a) of the rib (30), and a lower side part (30d) is formed under the lower joining part (30b) of the rib (30) to extend on the first and second joining members (10, 20) that contact the lower joining part (30b) of the rib (30).

The upper joining part (30a) and the lower joining part (30b) may have a first width (W1), and the upper side part (30c) and the lower side part (30d) of the rib (30) may have a second width (W2) that is greater than the first width (W1).

The first width (W1) of the upper and lower joining parts (30a, 30b) of the rib (30) and the second width (W2) of the upper and lower side parts (30c, 30d) of the rib (30) are related to the probe (1a) of the tool (10) for friction stir welding, the body (1a) of the tool (1) for friction stir welding, and the width of the probe (1b) drawn in FIG. 1.

Specifically, the first width (W1) of the upper and lower joining parts (30a, 30b) of the rib (30) is substantially greater than the width of the probe (1b) and the probe (1b) is rotationally inserted into the upper and lower joining parts (30a, 30b) that are between the first and second joining members (10, 20), and the second width (W2) of the upper and lower side parts (30c, 30d) is substantially the same as the lower width of the body (1a).

As stated above, the underside of the body (1a) has a concave shape with a predetermined radius of curvature, and the concave shape may improve the fluidity of the joining member, thus the strength of the weld after welding may be increased due to efficient agitation.

It is desirable that the thickness of the upper and lower side parts (30c, 30d) of the rib (30) may be 0.1 mm to 5 mm. If the thickness is less than 0.1 mm, the strength of the weld may be decreased, and if the thickness is greater than 5 mm, fluid flow phenomenon may be deteriorated.

As shown in FIG. 4, friction stir welding is conducted by fluidizing on the upper side of the rib (30) using the concave shape of the underside of the body (1a) and at the same time inserting the probe (1b) of the tool (1) for the friction stir welding into the upper joining part (30a).

The speed of the tool in the friction stir welding is 1500 rpm to 1700 rpm. If the speed of the tool is less than 1500 rpm or is greater than 1700 rpm, there may be some defects in the microstructure of the weld. It is desirable that the speed of the tool is around 1600 rpm.

It is desirable that a welding speed of the friction stir welding is 10 mm/s to 17 mm/s, and it is more desirable that the welding speed is around 14 mm/s.

Method 2 for Welding Hollow Structure

Figure 5:
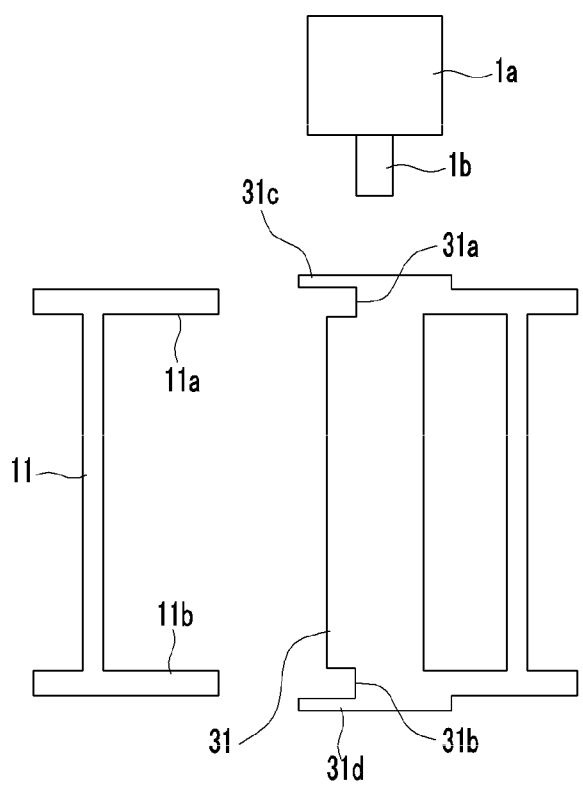
FIGS. 5 to 7 are drawings that explain the method for welding hollow structure according to an exemplary embodiment of the present invention.
Figure 6:
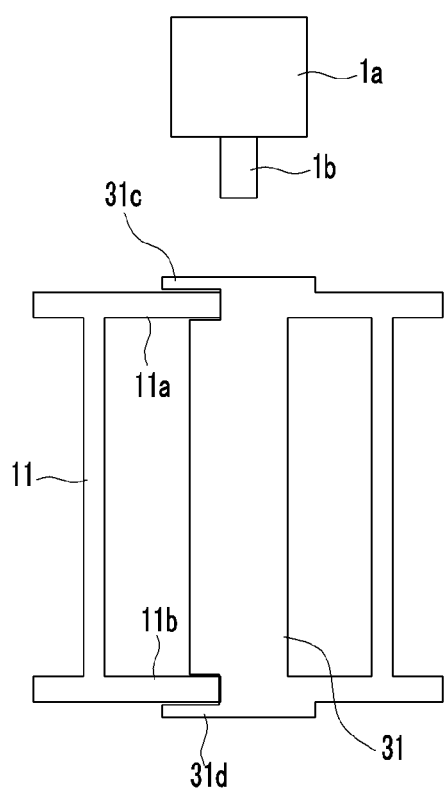
Figure 7:
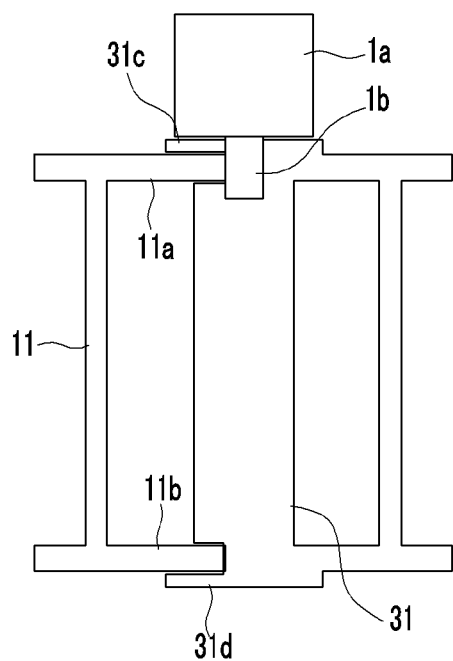

FIGS. 5 to 7 are drawings for explanation of the method for welding a hollow structure according to an exemplary embodiment of the present invention.

Referring to FIGS. 5 to 7, a joining member (11) and a rib (31) are prepared.

A recessed upper joining part (31a) and a recessed lower joining part (31b) are formed at the upper and lower sides of the rib (31).

An upper side part (11a) of the joining member (11) is combined to the upper joining part (31a) of the rib (31) and a lower side part (11b) of the joining member (11) is combined to the lower joining part (31b) of the rib (31), and an upper protruded part (31c) is formed on top of the upper joining part (31a) of the rib (31) to extend on the upper side part (11a) of the joining member (11), and a lower protruded part (31d) is formed below the lower joining part (31b) of the rib (31) to extend below the joining member (11) that is combined to the lower joining part (31b) of the rib (31).

The upper protruded part (31c) and the lower protruded part (31d) of the rib (31) may have a width that is substantially the same as the width of the body (1a) of the tool (1) for friction stir welding shown in FIG. 1.

The probe (1b) of the tool (1) for friction stir welding is rotationally inserted into the upper and lower joining parts (31a, 31b).

As described above, the underside of the body (1a) has a concave shape with a predetermined radius of curvature, and the concave shape improves the fluidity of the welding member, thus the strength of the weld after welding is increased due to efficient agitation.

It is desirable that the thickness of the upper and lower protruded parts (31c, 31d) is 0.1 mm to 5 mm. If the thickness is less than 0.1 mm, the strength of the weld may be decreased, and if the thickness is greater than 5 mm, the fluid flow phenomenon may be deteriorated.

As shown in FIG. 7, the friction stir welding is conducted by fluidizing at the upper protruded part (31c) using a concave shape of the underside of the body (1a) at the same time of inserting the probe (1b) of the tool (1) for friction stir welding into the upper joining part (31a).

Similarly, friction stir welding is conducted at the lower side of the rib (31).

The speed of the tool in the friction stir welding is 1500 rpm to 1700 rpm. If the speed of the tool is less than 1500 rpm or is greater than 1700 rpm, there may be some defects in the microstructure of the weld. It is desirable that the speed of the tool is around 1600 rpm.

It is desirable that the welding speed of the friction stir welding is 10 mm/s to 17 mm/s, and it is more desirable that the welding speed is around 14 mm/s.

Although exemplary embodiments of the present invention are described above, those embodiments are examples to explain the scope of protection recited in the claims and do not limit the scope of the protection of the present invention.

Also, the scope of the present invention may be extended to the scope that is technically equivalent to the claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for welding a hollow structure, comprising:
    preparing a first joining member having a length in a vertical direction, wherein the first joining member has:
        an upper side part formed at an upper edge portion of the first joining member in a horizontal direction with respect to the vertical direction, the upper side part having an inner side and an outer side; and
        a lower side part formed at a lower edge portion of the first joining member in a horizontal direction with respect to the vertical direction, the lower side part having an inner side and an outer side;
    preparing a second joining member having a length in the vertical direction, wherein the second joining member has:
        only one recessed upper joining part formed at an upper side of the second joining member, sized to receive the upper side part of the first joining member;
        only one recessed lower joining part formed at a lower side of the second joining member, sized to receive the lower side part of the first joining member;
        only one upper protruded part that extends in the horizontal direction toward the upper side part of the first joining member such that an inner side of the upper protruded part contacts the outer side of the upper side part while the inner side of the upper side part contacts a bottom surface of the recess in the upper joining part when the upper side part is inserted into the upper joining part; and
        only one lower protruded part that extends in the horizontal direction toward the lower side part of the first joining member such that an inner side of the lower protruded part contacts the outer side of the lower side part while the inner side of the lower side part contacts a top surface of the recess in the lower joining part when the lower side part is inserted into the lower joining part; and joining the first joining member and the second joining member by friction stir welding, wherein the friction stir welding is conducted using a tool that includes a cylindrical shaped body and a probe that extends outward from an underside portion of the body.

2. The method of claim 1, wherein a speed of the tool in the friction stir welding is 1500 rpm to 1700 rpm.

3. The method of claim 1, wherein a welding speed of the friction stir welding is 10 mm/s to 17 mm/s.

4. The method of claim 1, wherein
    a diameter of the body is substantially greater than a diameter of the probe,
    the underside portion of the body has a concave shape with a predetermined radius of curvature, and
    the body and the probe share a same center line with an axis of a spindle (a) to which the tool is fixed and (b) which provides torque to the tool.

5. The method of claim 4, wherein the upper protruded part and the lower protruded part of the second joining member have a width that is substantially the same as the diameter of the body.

6. The method of claim 1, wherein a thickness of the upper protruded part and the lower protruded part of the second joining member is 0.1 mm to 5 mm.

7. The method of claim 1, wherein a width (W1) of the upper protruded part and a width (W2) of the lower protruded part are substantially equal.

8. The method of claim 7, wherein:
    a portion of the second joining member connecting the upper protruded part and the lower protruded part has a width (W3);
    W3 is less than W1; and
    W3 is less than W2.

9. The method of claim 1, wherein an area of the inner side of the upper side part contacting the second joining member is less than an area of the outer side of the upper side part contacting the second joining member when the upper side part of the first joining member is inserted into the recessed upper joining part of the second joining member.

10. The method of claim 1, wherein joining the first joining member and the second joining member comprises inserting the probe into the second joining member when the upper side part is inserted into the recessed upper joining part and the lower side part is inserted into the recessed lower joining part such that the inserted probe contacts the upper side part inserted into the recessed upper joining part.

11. The method of claim 10, further comprising: fluidizing at the upper protruded part using a concave shape of the underside portion of the body when the probe of the tool is inserted into the recessed upper joining part for the friction stir welding.

12. The method of claim 1, further comprising: inserting the upper side part into the recessed upper joining part in the horizontal direction; and inserting the lower side part into the lower joining part in the horizontal direction.

13. The method of claim 12, further comprising: inserting the probe of the tool into the second joining member in the vertical direction such that the inserted probe contacts the upper side part inserted into the recessed upper joining part.

14. The method of claim 13, wherein a length of the probe is greater than a height of the recessed upper joining part such that an entire surface of an end portion of the inserted upper side part contacts one side of the probe.

15. The method of claim 1, wherein both the only one recessed upper joining part and the only one recessed lower joining part are formed on a left or right side of the second joining member.

16. The method of claim 1, further comprising: inserting the upper side part and the lower side part into the recessed upper joining part and the recessed lower joining part, respectively, formed at only the left or right side of the second joining member.

\* \* \* \* \*